… (United States Patent Office)

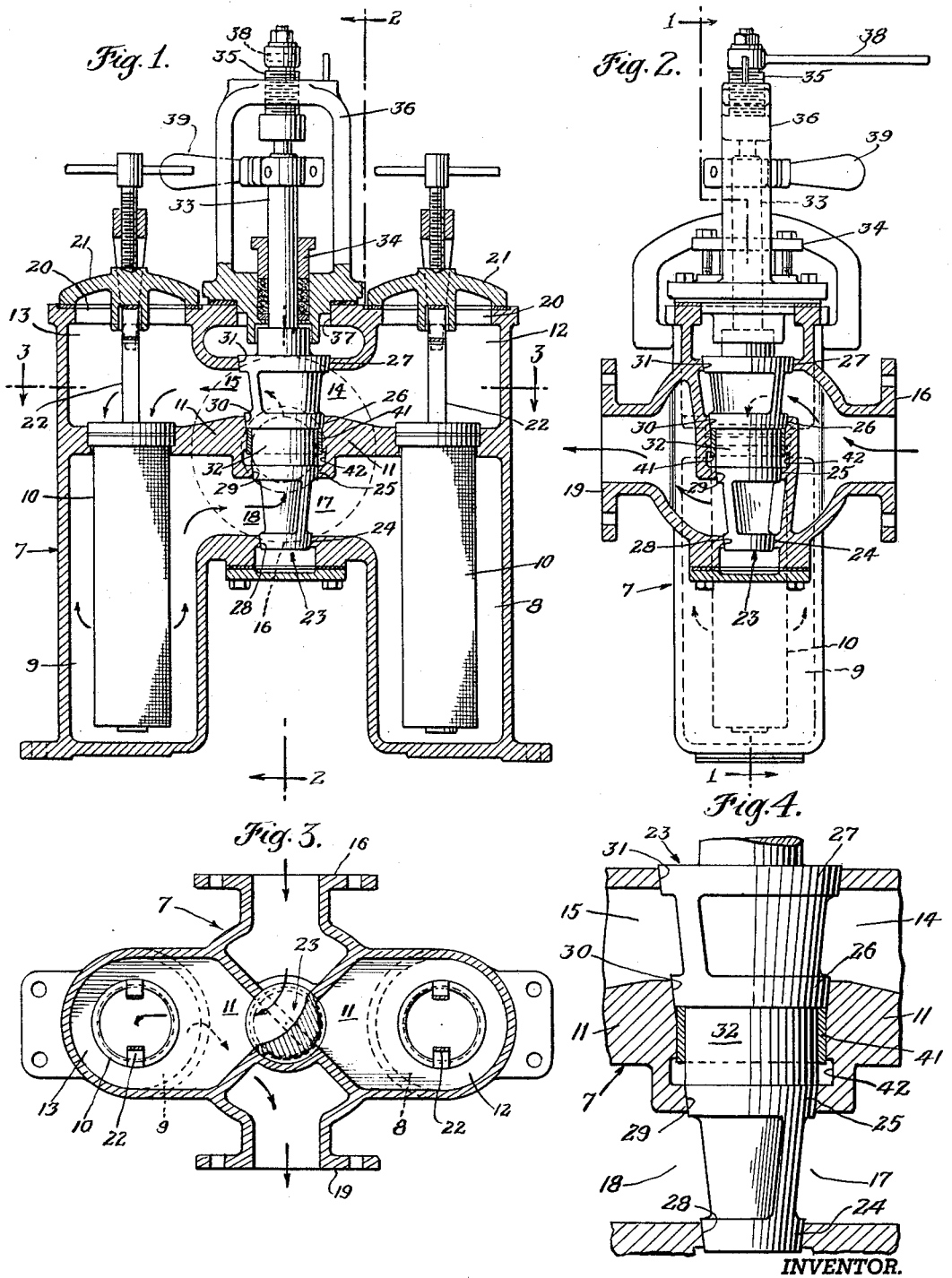

3,394,735
VALVE MEMBER FOR A DUPLEX STRAINER
Alfred Wurster, Philadelphia, Pa., assignor to Andale Company, Lansdale, Pa., a corporation of Pennsylvania
Continuation of application Ser. No. 425,567, Jan. 14, 1965. This application Feb. 27, 1967, Ser. No. 632,130
3 Claims. (Cl. 137—625.32)

ABSTRACT OF THE DISCLOSURE

An axially shiftable and rotatable plug type valve, particularly suitable for duplex basket strainers, having tapered valve surfaces and a cylindrical central section.

---

This application is a continuation of my application Ser. No. 425,567, filed Jan. 14, 1965, and now abandoned.

My invention relates to a plug valve assembly for duplex basket strainers of the general type illustrated in McNeal Patent No. 2,893,681.

In this type of strainer the stream of fluid being strained away from the strainer compartment in which the basket may need cleaning through the other compartment in which a clean basket has been placed can be switched by a single movement of the valve. The compartment which has been shut away from the stream can be opened and its basket can be removed, cleaned and replaced while straining continues through the basket in the other compartment.

The use of a plug type valve in such a strainer is advantageous for the plugs and valve shaft can be made integral to be operated as a unit and errors in timing, or in sequence or extent of opening or closing any port relative to other ports are not possible.

However, in such construction as they are now built, there is the possibility of leakage of unstrained fluid into the clean fluid and when the fluid being strained is oil, this contamination of the strained oil by the unstrained may lead to difficulties in the lubrication of the high speed machinery in use today.

This leakage of strained into unstrained fluid is possible because of the fact that the passageways for the strained and unstrained fluid are separated only by a partition wall in which a tapered seat is formed for one of the plug valve discs and when this disc is lifted from its seat, as it must be in order to turn the valve, there is a brief period when the fluid from the unstrained fluid passageway can pass into the strained fluid passageway.

It is the primary object of my invention to provide a duplex strainer with a valve assembly which while retaining all the advantages of the use of a valve having integral plugs and shaft will overcome the objectionable leakage of unstrained into the strained fluid.

It is a further object of my invention to provide a duplex strainer of the plug valve type wherein the wear of the tapered portion of the plug valve or the plug valve seats will not affect the seal between the passages for the strained and unstrained fluid passing through the duplex strainers.

I have illustrated my invention in preferred form in the accompanying drawings, wherein:

FIGURE 1 is a sectional elevational view taken on the line 1—1 of FIGURE 2.

FIGURE 2 is a sectional elevational view taken on the line 2—2 of FIGURE 1.

FIGURE 3 is a plan section taken on the line 3—3 of FIGURE 1, and

FIGURE 4 is an enlarged view of the plug valve and surrounding structures.

Referring to the drawings and initially to FIGURES 1 and 2, a strainer unit of the duplex basket type with its operating valve assembly is shown in position to direct the flow of fluid being strained through the left hand strainer. Since the present invention relates primarily to the valve assembly, one side only of the strainer unit will be described in detail as illustrative of both sides as the two sides are the same.

The strainer body 7 has a strainer chamber 8 to the right and a strainer chamber 9 to the left. A strainer basket 10 is suspended in each chamber from a partition member 11 which is integral with the body 7. This partition member forms upper chambers 12 and 13 which are connected by transverse inlet passages 14 and 15 respectively to flanged inlet 16. The strainer chambers 8 and 9 are connected by transverse outlet passages 17 and 18 respectively to flanged outlet 19.

Each upper strainer compartment has an opening 20 giving access to the compartment for removal of the strainer basket 10. Each opening 20 has a removable cover 21 which coacts with the spring type handles 22 of the strainer baskets to press the flanges of the baskets into firm engagement with the partition 11.

For controlling and selectively directing the circulation of the fluid through the two basket strainers 10 a one-piece plug valve member 23 is provided. The plug valves of member 23 have four tapered valve discs 24, 25, 26 and 27 spaced to cooperate with tapered valve disc seats 28, 29, 30, 31. The upper seat 31 is formed in the top portion of the body 7; the seat 30 is formed in the upper face of partition 11; the seat 29 is formed in the lower face of the partition 11 and the lower seat 28 is formed in a bottom portion of the body 7. It will be noted that the valve discs and seats all taper in the same direction to permit the member 23 to be lifted slightly when the valve is to be turned.

The inlet controlling plug of the valve member 23 is separated from the outlet controlling plug by a cylindrical valve section 32 which extends through an opening in the partition 11 and connects the inlet and outlet controlling plugs.

A valve stem 33 rises through stuffing box 34 and at its upper end is connected to jack screw 35 which is threaded into the yoke or valve bonnet 36. This bonnet is secured to the top of valve body 7 in coaxial relation to the aperture 37 in the valve body which is provided for the passage of the valve plugs. The jack screw 35 is operated by jack lever 38 which when turned will lift the valve member 23 and associated plug valves from the valve seats and permit free turning of the valve member 23 by means of plug turning lever 39. This turning movement is limited to 90° and when the movement has been completed, the flow of fluid through the strainer will be switched from one strainer compartment to the other.

In order to prevent the flow of fluid from inlet passages 14 and 15 into outlet passages 17 and 18 I have provided the cylindrical valve section 32 which passes through a cylindrical opening in the partition member 11. The upper portion of the wall of this opening is tapered to form valve disc seat 30 and the lower portion is tapered to form valve disc seat 29.

The intermediate portion of the cylindrical valve section, however, is provided with a cylindrical sleeve 41 which is secured to the cylindrical section by press or shrink fit and thus in effect becomes an integral part of the plug. The inside diameter of the partition opening and the outside diameter of the cylindrical sleeve 41 are machined to limit the maximum total clearance between the wall of the partition opening and the sleeve to less than the diameter of the openings of the basket strainer mesh. In the claims I have referred to this as a "close fit." It will be understood that any particle of contaminating material which is too large to pass through the screen mesh will thus be too large to pass between the sleeve 41 and the wall of the opening in the partition with the result that a contaminating matter which will not pass the screen mesh cannot pass from inlet passages 14 and 15 into outlet passages 17 and 18 about the cylindrical section of valve member 23 when the member is lifted to permit turning of the valve.

In order to prevent wear on the tapered valve discs and seats from affecting operation, I provide an annular groove 42 in the wall of the opening in partition 11 below the lower end of the sleeve 41. Thus, there is nothing to prevent the sleeve 41 from assuming a lower position in the cylindrical opening in the partition 11 when wear on the tapered surfaces of the valve discs and valve seats occurs.

Although I have illustrated and claimed my invention in connection with a valve member for a duplex strainer, it will be understood that it will be useful in any mechanism wherein it is desirable to switch the flow of fluid from one chamber of a valve through another chamber of a valve and I consider my improved valve mechanism to be adapted to all such uses.

I claim:

1. A double plug valve assembly comprising a valve body having a fluid inlet and a fluid outlet, a pair of compartments each having an inlet and an outlet passageway, a partition member lying between the inlet and outlet passageways of the compartments, a valve member having tapered inlet and outlet valve plugs located respectively at opposite sides of said partition member and providing for alternative connection of the body inlet to either of the compartment inlet passageways and for alternative connection of the body outlet with either of said compartment outlet passageways, a cylindrical opening in said partition, the valve member having a cylindrical section interconnecting said valve plugs and having a sealing surface extending through and having a close fit against the wall of said opening, the cylindrical section being axially slidable in said opening, tapered valve seats for the valve plugs and means to axially lift, and then turn and reseat said valves to alternatively connect the compartments with the inlet and outlet of the valve body.

2. A construction according to claim 1 wherein the tapered valve seats are aligned axially of the valve member, and wherein the cylindrical section includes a cylindrical sleeve tightly fitting the valve member, said sleeve making said close sliding fit with the wall of said opening.

3. A construction according to claim 1 wherein the tapered valve seats are located adjacent opposite sides of the partition member and are aligned axially of the valve member, and wherein the cylindrical section includes a cylindrical sleeve tightly fitting the valve member, said sleeve making said close sliding fit with the wall of said opening, and an annular groove in the wall of said opening below said sleeve.

References Cited

UNITED STATES PATENTS

| | | | |
|---|---|---|---|
| 236,496 | 1/1881 | Howes | 137—625.32 X |
| 812,232 | 2/1906 | Rhodes | 137—595 X |
| 1,661,675 | 3/1928 | Norquist | 210—140 |
| 2,893,681 | 7/1959 | McNeal | 251—161 |
| 3,108,779 | 10/1963 | Anderson | 251—309 |
| 3,116,755 | 1/1964 | McNeal | 210—341 X |

FOREIGN PATENTS

| | | |
|---|---|---|
| 768,429 | 2/1957 | Great Britain. |
| 921,912 | 3/1963 | Great Britain. |

ARNOLD ROSENTHAL, *Primary Examiner.*